United States Patent
Ferman

(10) Patent No.: US 6,502,729 B2
(45) Date of Patent: Jan. 7, 2003

(54) VEHICLE-MOUNTED LOAD CARRIER

(75) Inventor: Magnus Ferman, Värnamo (SE)

(73) Assignee: Industri Ab Thule, Hillerstorp (SE)

(*) Notice: Subject to any disclaimer, the term of this patent is extended or adjusted under 35 U.S.C. 154(b) by 0 days.

(21) Appl. No.: 09/683,110

(22) Filed: Nov. 19, 2001

(65) Prior Publication Data

US 2002/0047031 A1 Apr. 25, 2002

Related U.S. Application Data

(63) Continuation of application No. PCT/SE00/01045, filed on May 24, 2000.

(30) Foreign Application Priority Data

May 28, 1999 (SE) .............................. 9901956

(51) Int. Cl.$^7$ .............................. B60R 9/00
(52) U.S. Cl. .............. 224/497; 224/500; 224/505; 224/510; 224/536; 224/924
(58) Field of Search .................... 224/497, 500, 224/505, 510, 514, 536, 314, 924

(56) References Cited

U.S. PATENT DOCUMENTS

| | | | | |
|---|---|---|---|---|
| 4,050,616 A | * | 9/1977 | Mosow ................. | 211/17 |
| 5,038,980 A | * | 8/1991 | Baldeck ................ | 224/493 |
| 5,645,202 A | * | 7/1997 | Kaloustian ........... | 224/314 |
| 5,826,767 A | * | 10/1998 | Chimenti et al. ..... | 224/314 |
| 6,345,748 B1 | * | 2/2002 | Chimenti et al. ..... | 224/314 |

FOREIGN PATENT DOCUMENTS

| | | |
|---|---|---|
| DE | 4039723 A1 | 6/1992 |
| DE | 4134715 C1 | 4/1993 |
| DE | 4214567 A1 | 8/1993 |
| DE | 4427450 A1 | 3/1995 |
| WO | WO 9730870 A1 | 8/1997 |

* cited by examiner

Primary Examiner—Stephen K. Cronin
(74) Attorney, Agent, or Firm—Howrey Simon Arnold & White LLP

(57) ABSTRACT

The present invention is concerned with a vehicle-mounted load carrier (1) of the type which is fastened across a door, hatch (2) or the like, preferably at the rear of the vehicle (3). The load carrier comprises a load-bearing frame (4–6) and at least two gripping means (18, 19, 21, 22) disposed on the frame and intended to grip two substantially mutually opposite edges, preferably the top and the bottom edge of the door, and means (25, 26) for tensioning the gripping means across the door by the positive relative displacement thereof towards each other. The novel characteristics of the invention are that the frame is divided into a main section (4), bearing the gripping means (18, 19) for one edge, and at least one tensioning section (5, 6) disposed moveably in relation to the main section and bearing the gripping means (21, 22) for the other edge, and that the main section and the tensioning section are connected to each other in a linearly displaceable fashion, tensioning being achieved by the mutual displacement of the frame sections.

22 Claims, 4 Drawing Sheets

VEHICLE-MOUNTED LOAD CARRIER

CROSS REFERENCE TO RELATED APPLICATIONS

This is a continuation patent application of International Application Number PCT/SE00/01045 filed May 24, 2000 that designates the United States. The full disclosure of said application, in its entirety, is hereby expressly incorporated by reference into the present application.

BACKGROUND OF INVENTION

1. Field of Technology

The present invention relates to a vehicle-mounted load carrier; and more particularly, to those types of load carriers that are fastened across a door, hatch or the like, and preferably at the rear of the vehicle.

2. State of the Art

A vehicular load carrier of the above-mentioned type is disclosed in international patent application WO 97/30870. The load carrier of WO 97/30870 has a load-bearing frame with two gripping means at the upper end and two gripping means at the lower end. When mounted on a vehicle, the entire load carrier is hooked to a rear hatch. Before installation, however, the distance between the top and bottom hooks must be somewhat greater than the height of the hatch. After the load carrier has been hooked to the hatch, the distance between the hooks must be adjusted so that the load carrier is fastened to the hatch. FIG. 2 of WO 97/30870 shows a tensioning means in which a bracket is caused, by means of an adjusting device, to fasten the load carrier to the vehicle by means of clip(s). In this way the load carrier is suspended from the hatch by its upper gripping means.

Load carriers of the type shown in WO 97/30870 suffer from a number of drawbacks. The adjusting mechanisms themselves require numerous turns of handles, which are located behind the frame, before the load carrier is securely fastened. This is inconvenient, and with the effects of time, it is highly likely that the threads will become stiff making adjustment positively difficult for a person whose wrists are weak. Moreover, the available adjustment distance is short, with the result being that if a user should wish to use the load carrier on another vehicle with different hatch size, this type of load carrier requires extensive reconstruction including removal of screws and remounting in new holes, if such reconstruction is even possible.

SUMMARY OF INVENTION

The present invention makes available a load carrier that is easy and quick to fasten to a carrying vehicle, that is adjustable within wide limits, and whose operating parts are unlikely to be affected by corrosion and the like. For these purposes, the load carrier has a frame that is divided into a main section that bears the gripping means for one edge and at least one tensioning section that is moveable with respect to the main section and which bears the gripping means for the other edge. The main section and tensioning section are connected to each other in a linearly displaceable fashion such that tensioning can be achieved by bringing about the mutual linear displacement of the frame sections by the tensioning means.

In at least one embodiment, the load carrier includes a load-bearing frame and at least two gripping means disposed upon said frame. The gripping means are designed to grip two substantially mutually opposite edges, preferably the top and bottom edge of a door to the vehicle. A means for tensioning the gripping means across the door by the positive displacement thereof towards each other is also provided.

In a preferred embodiment of the invention, the frame includes at least one, but preferably—for the sake of better stability and less cumbersome gripping means—two tensioning sections. Each section bears a gripping means for one of the edges of the hatch, and each is connected to the main part of the carrier by a pair of preferably telescopic tubes that are disposed, one on each side of the load-bearing frame. Telescopic tubes are a simple and reliable design for linear motion, which in the present case may be integrated into the construction by choosing suitable dimensions for the constituent parts.

Furthermore, quick fastening can be achieved if each tensioning means includes an operating means rotatably mounted about a shaft and having a surface which is eccentric with respect to the shaft, and a fulcrum having a bearing surface that interacts with the eccentric surface of the operating means. The shaft, and hence the operating means, are mounted to one of the frame sections. The fulcrum is mounted on the other frame section so that the operating means, and hence the load carrier, can be caused to assume an unfastened and a fastened position corresponding respectively to a more and a less centered position of the fulcrum in relation to the shaft and to corresponding relative displacements of the frame sections. In a variant of the this embodiment of the invention, the shaft of the operating means is mounted to pass transversely through the outer telescopic tube via elongated holes extending along the length of the tube. This permits displacement of the shaft along the tube. A drag link is provided inside the tube between the shaft and the inner telescopic tube, which in combination with the fulcrum is disposed on the outer tube and the eccentric surface disposed on the operating means in such a manner that the rotation of the operating means from the unfastened into the fastened position, by the interaction between the eccentric surface of the operating means and the fulcrum, causes the shaft, the drag link, and hence the inner tube to slide telescopically into the outer tube. This design features a protected location inside the tubes and is thus durable, relatively simple, and reliable. To permit simple dimensional adjustment such as that which is desirable, for example, when changing vehicles, the drag link may be provided with a connector to the shaft which is selectably adjustable along the length of the drag link.

A very useful solution for an adjustable connection between the drag link and the shaft is of the type used in so-called Polygrip pliers, namely, the drag link is elongated in form, the shaft extends through a hole in the drag link. The hole in the drag link is elongated and disposed longitudinally along the drag link and is formed with a slip side, which is straight, and a locking side having a row, parallel to the slip side, of mutually adjacent notches having the shape of circular segments. The shaft is of a cross-section having the form of the major segment of a circle with a removed part in the form of a minor segment. The diameter of the circle is substantially equal to the perpendicular distance between the slip side and the bottom of one of the circular segment shaped notches. The smallest thickness of the shaft at the "removed" segment is substantially equal to the perpendicular distance between the slip side and the peaks separating the notches. In this embodiment the shaft is rigidly united to the operating means in such a manner that when the operating means is in its unfastened position, the shaft has its least thickness perpendicular to the slip side and moveable in relation to the hole in the drag link. When the operating means is in its fastened position, part of the shaft is located in one of the circular segment shaped notches, blocking transverse movement of the drag link in relation to the shaft.

BRIEF DESCRIPTION OF DRAWINGS

The invention will be more particularly described and explained below with reference to an example of the embodiment shown in the attached figures in which.

DETAILED DESCRIPTION

Figure 1:
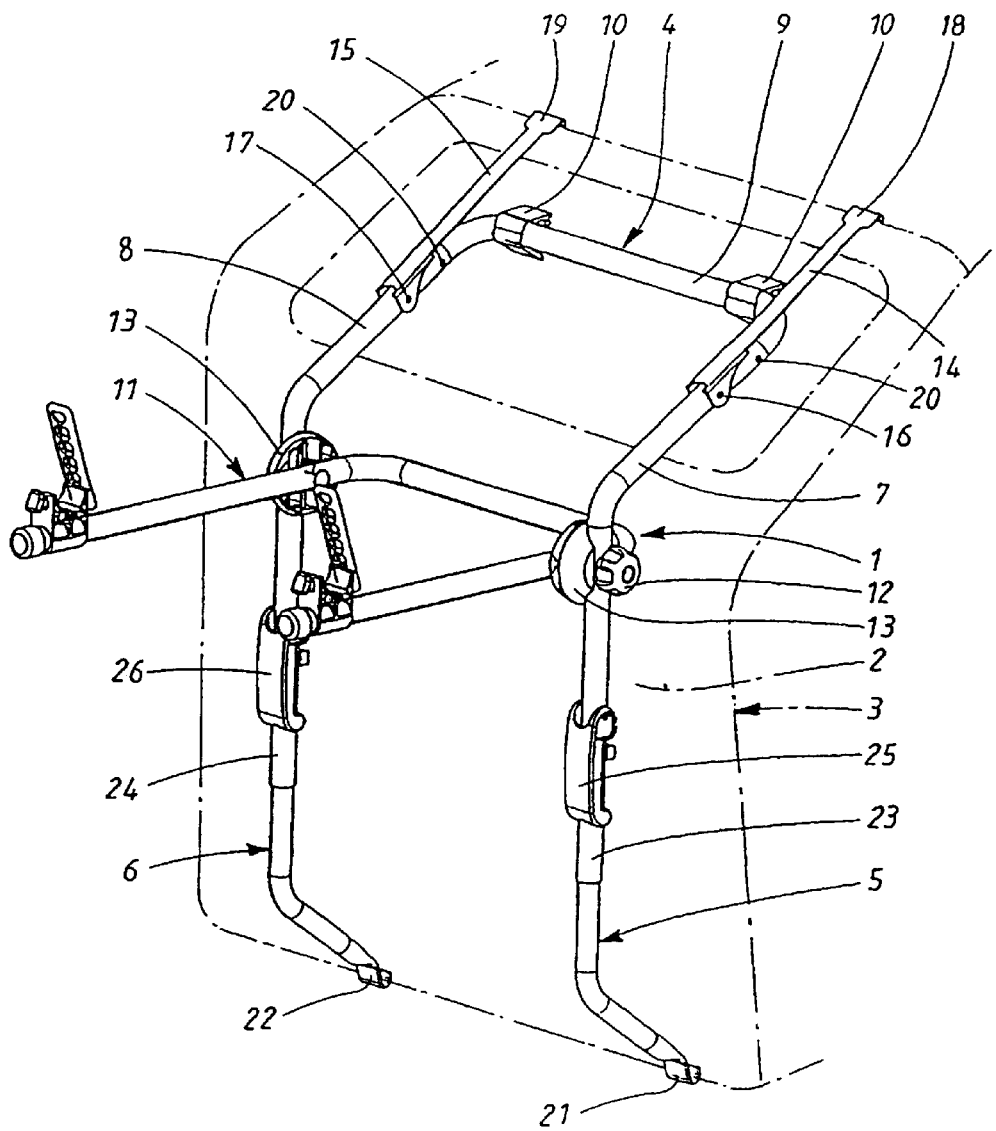
FIG. 1 is a perspective view of a load carrier configured according to the present invention.
Figure 2:
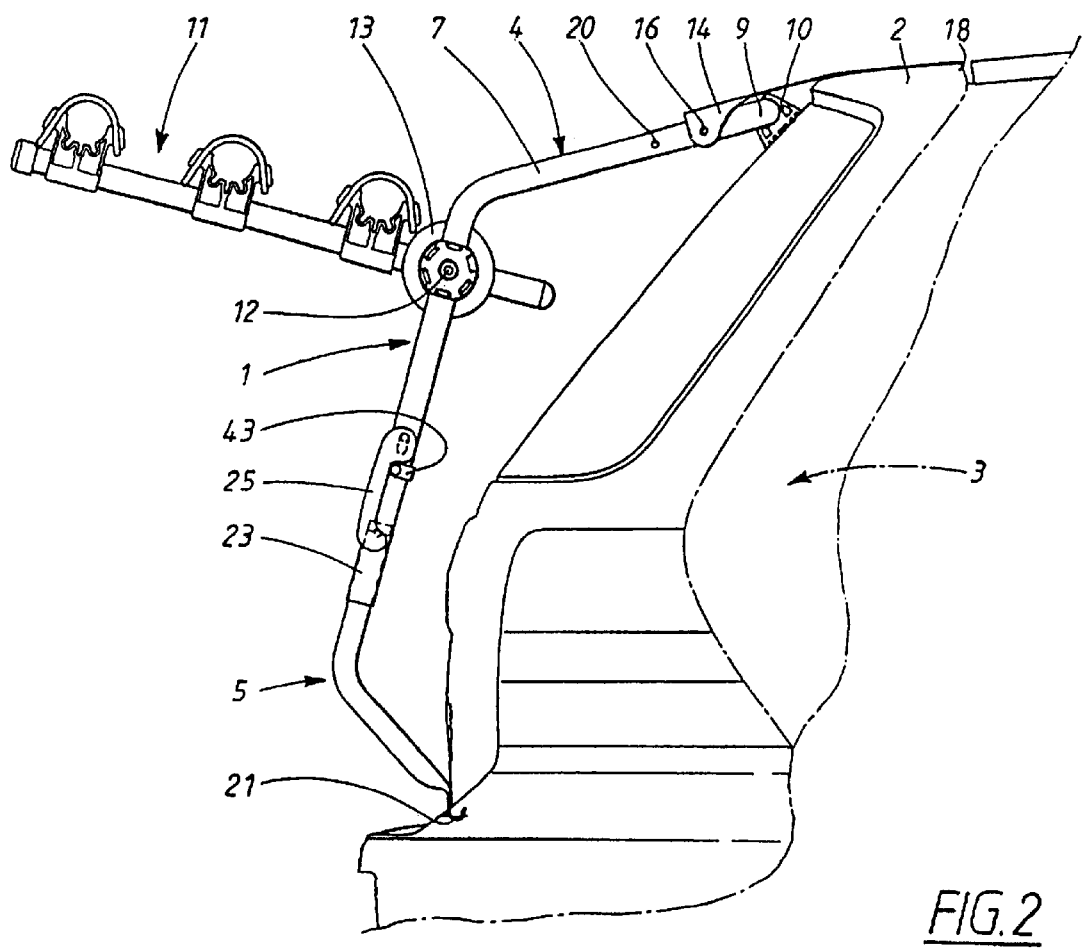
FIG. 2 is a side elevational view of the load carrier shown in FIG. 1.

It may be seen from FIG. 1 that the load carrier of the present invention includes a load-bearing frame 1, also referred to as a rear-mount vehicular load carrier frame which is shown fastened to the rear hatch or door 2 of a motor vehicle 3 which is indicated by dashed lines. The load-bearing frame has an upper frame section or portion 4 and two lower frame sections or portions 5 and 6. These frame sections are constructed of substantially rigid tubing of substantially circular cross-section. The upper frame section 4 is U-shaped with its arms 7 and 8 pointing at least partly downwards. The two arms or arm portions 7 and 8 and the two lower frame sections or elongate legs 5 and 6 are each bent at respective similarly located points in such a manner that the load carrier stands clear of the hatch and is in contact therewith only at the ends of the lower frame sections 5 and 6 and at the base or bight 9 of the U-shaped member where two rubber feet 10 which are press-fit around the base provide support against the vehicle. The upper frame section is laterally stabilized not only by the base 9 of the upper U-shaped member, but also by a cycle carrier 11 mounted below the bends in the arms 7, 8. The cycle carrier 11, like the frame, is U-shaped and constructed of tubing and is fixed to the arms 7, 8 near base sections thereof. Connection between the frame 1 and the cycle carrier member 11 is accomplished through the utilization of such means as a fixing screw, together with a knob 12 and a spacer 13 of known type. Such an arrangement is provided on both sides of the carrier and includes recesses that receive the various tubes for the purpose of locking the parts in relation to each other when the knobs are tightened. In the present case, that is with the cycle carrier arms projecting outwards for the purpose of carrying bicycles. The two-arm aspect of the cycle carrier will not be further described since it is readily understood by those skilled in the art.

Hitching means 14, 15 are provided on the parts of each of the arms 7, 8 adjacent to the base or bight 9 of the U-shaped member. The hitching means 14, 15 are provided for establishing an attachment to the top of the hatch or door. The hitching means are preferably at least to some degree rotatably mounted on the arms 7, 8 by means of respective through pins 16, 17. Each of the hitching means 14, 15 are fitted at their upper end with a hook 18, 19 that is hitchable to the top of the door 2. Collectively, these hitch means and hooks may be collectively referred to as a securement arrangement for releasably securing the load carrier to a carrying vehicle. The rotatability is an advantage when changing host vehicles, and the hooks can also be interchanged with hitching means of differing dimensions, such as with respect to length in order to fit vehicles of different types. The hitching means may also be moved to other holes 20 to change the gripping width. For hitching to the lower edge of the door 2, the lower frame sections 5 and 6 are each provided with a lower hook 21, 22, respectively.

The upper frame section 4 and the respective lower frame sections 5, 6 are mutually connected inasmuch as the lower frame sections 5, 6, whose tubing is of a smaller diameter than that of the upper frame section 4, are inserted telescopically a certain distance into a tube section 23, 24 of the arms 7, 8 of the upper frame section 4. This cooperative arrangement may be described as a telescoping arrangement. Operating means 25, 26 are provided that adjoin the telescopic sections that during the mounting of the load carrier on the vehicle (vehicle-secured configuration) or its removal therefrom (vehicle-released configuration), permit the upper frame section 4 and the lower frame sections 5, 6 to pull together or apart by the telescopic sliding of the lower frame sections 5, 6, a certain distance in or out of the tubing forming the upper frame section 4. The operating means 25, 26 form part of a tensioning device having a design that will be explained hereafter and that are shown in greater detail in FIG. 35. Since the tensioning devices of the two lower frame sections 5, 6 are identical, only one will be described.

Figure 3:
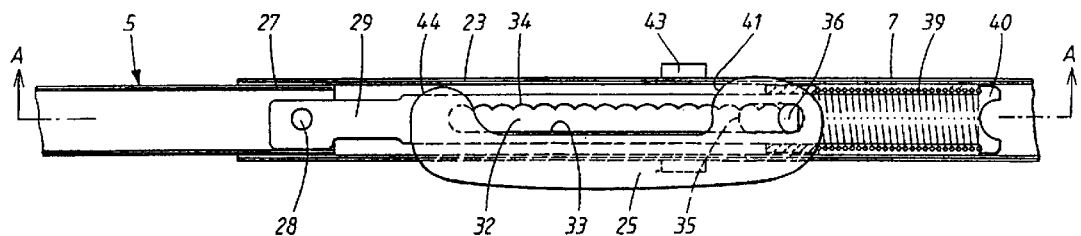
FIG. 3 is a side elevational, partial cutaway view of a tensioning device of the load carrier shown in the fastened position.
Figure 4:
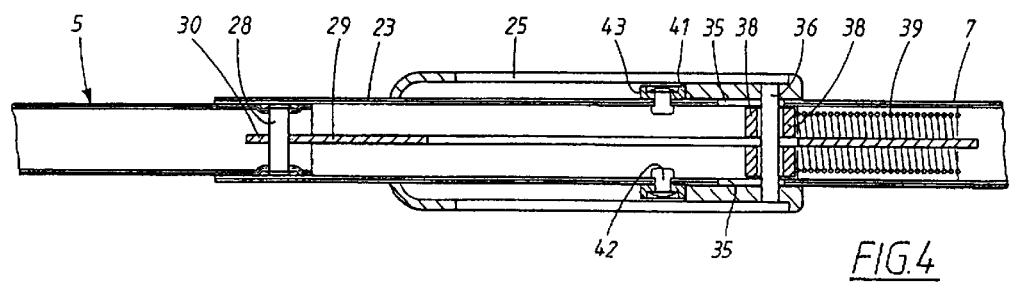
FIG. 4 is an elevational view showing a section taken along line AA in FIG. 3, but with certain parts not shown in section for the sake of simplicity.

An elongated drag link 29 is connected to the end 27 of the frame section 5 located inside the arm 7 by means of a rivet 28 passing through the tube end 27. The drag link 29 is constructed of flat bar with a hole 30 for the rivet 28 and extends from the tube end 27 into the tube section 23 of the arm 7. The drag link is provided with a longitudinally oriented Polygrip type opening or elongate aperture 32 passing through the thickness thereof. The opening is formed with a straight or smooth slip side 33 and, disposed parallel thereto, a gripping or scalloped side 34 formed of a number of mutually adjoining and similar recesses each having the shape of a minor circular segment, i.e. the opening 32 is of the type found in so-called Polygrip pliers. The opening 32 in the drag link 29 extends past two mutually parallel and opposite elongated shaft openings 35 in the wall of the tube section 23. A shaft 36 passes through the shaft openings 35 and the Polygrip opening 33. The shaft 36 projects a certain distance on each side of the tube section 23, where it is connected at each side to the operating means 25 that has the form of a handle which half encircles the tube section 23. The shaft 36 has a width of variable dimension. The shaft 36 has the cross-section of a major circular segment such that the shaft has a plane surface 37 where the minor segment has been removed. The shaft 36 is furthermore of a size such that its greatest diameter is substantially equal to the perpendicular distance between the slip side 33 and the bottom of one of the circular segment shaped notches in the Polygrip side 34 and its least thickness at the plane surface 37 is substantially equal to the perpendicular distance between the slip side and the peaks separating the notches of the Polygrip side 34. The drag link 29 is thus displaceable relative to the shaft 36 when the shaft 36 is positioned with its plane surface parallel to the slip side. This is the case when the operating means projects substantially perpendicularly to the arm 7 as in FIG. 5; that is, in its unfastened position. The drag link 29 is fixed relative to the shaft 36 when the shaft 36 is positioned with its plane surface perpendicular to the slip side 33 and is in engagement with one of the circular segment shaped notches in the Polygrip side 34, which is the case when the operating means is disposed along the tube section 23 as in FIG. 3. The connection between the shaft 36 and the operating means 25 arises from the circumstance that the shaft 36 is non-circular and its attachment holes in the operating 25 are of matching non-circular form so that the shaft 36 is rigidly united with the operating means.

Disposed inside the tube section 23 and coaxially therewith is a retaining ring 38 through which the shaft 36 passes. A biasing member in the form of helical spring 39 extends inside the tube from the retaining ring 38 to the inner end of the drag link inside the arm 7. The helical spring is confined between the retaining ring 38 and hooks 40 fitted on the inner end of the drag link 29 for that purpose, and thus tends on the one hand to force the drag link 29 inwards towards its bottom position inside the arm 7 and on the other hand to press the retaining ring outwards. This causes the shaft 36 to bear upon that end of the shaft openings 35 located nearer the mouth of the tube section 23.

Figure 5:
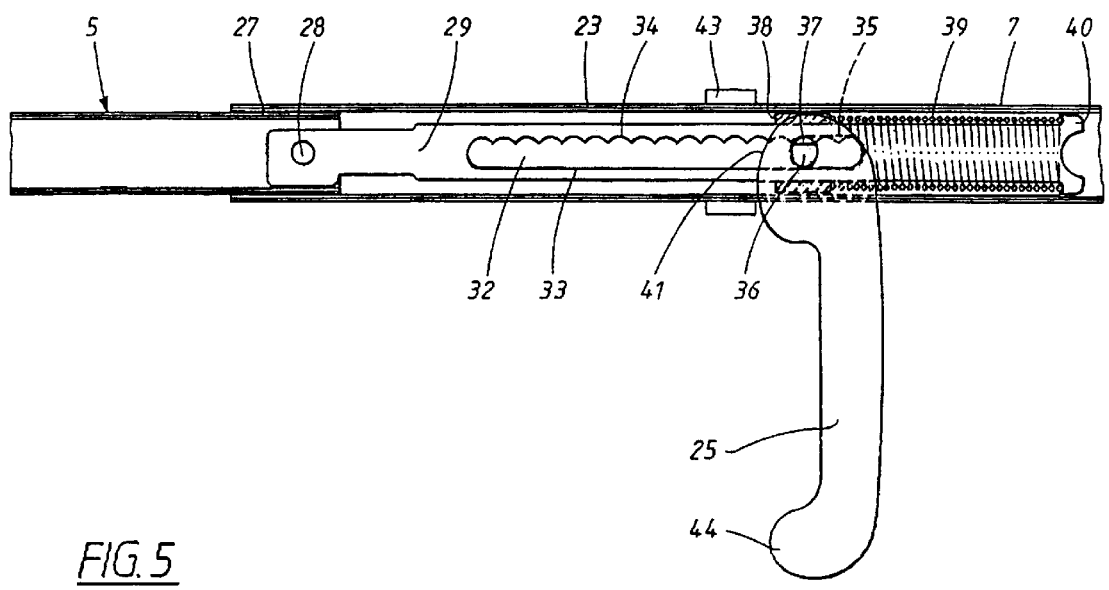
FIG. 5 is an elevational view similar to FIG. 3, but with the tensioning device in the unfastened position.

When the load carrier is to be mounted on a vehicle 3 the procedure is as follows. The hooks 18, 19 of the load carrier are hitched over the top of the door 2 and the feet 10 are placed against the door or the door window, depending upon the door's design. The operating means 25, 26 on the two arms 7, 8 are positioned to project away from the tubes. The lower frame sections 5, 6 are then pulled out, against the force of the respective springs 39, so that the lower hooks 21, 22 can be hitched around the bottom edge of the door. Upon operator release, the springs 39 cause the drag links 29 to draw the tube ends 27 a certain distance into the tubular arms so that the hitching means 21, 22 grip the bottom edge of the door 2 securely. Then in the final fastening operation, the operating means 25 are moved from their projecting, unfastened positions as shown in FIG. 5 to their fastened positions parallel to the arms as in FIG. 3. This brings about two things. In the first place, the shaft 36 rotates in the Polygrip opening 32 of the drag link so that its plane surface leaves the position in which the drag rod is free to move and engages with a nearby notch of the Polygrip opening 32. In the second place, a slip surface 41 of the operating means 25, disposed eccentrically in relation to the shaft 36, is caused to interact with a fulcrum 43 fixed by means of rivets 42 to the arm 7. The eccentric surface 41 and the fulcrum 43, which consists of a ring disposed around the tubular arm, are so dimensioned and located that with the operating means positioned with the shaft 36 at the outer end of the shaft openings 35 and the operating means in the unfastened position, the eccentric surface of the operating means is bearing on the fulcrum. As the operating means is turned towards its fastened position, the eccentricity of the surface bearing on the fulcrum increases, causing the shaft 36 to move in the shaft openings 35 towards that end of the shaft openings 35 located further from the mouth of the arm, in which movement it draws the drag link 29 with it. Thus when the operating means has reached its fastened position, the whole load carrier is firmly tensioned across the door.

In order to retain the operating means in the fastened position, the end thereof facing away from the shaft 36 may be formed with a nose 44 which extends around the tube to the side thereof facing away from the operating means and is secured with a snap fastening. Alternatively, the eccentric surface may be designed to have a slight decrease in its eccentricity towards the end of the motion so as to be self-locking.

While the invention is described and explained above with reference to an example of embodiment, the invention is to be regarded in a broader perspective, limited only by the following claims, within which numerous variants are possible. For example, it is technically possible to utilize, in place of the drag link mechanism, a drag rod with a ring united with the operating means. In this configuration, the ring and drag rod may be provided either with interacting threads, such that the length of the lower frame sections is set by screwing the lower frame sections in or out, or with complementary multi-bayonet fittings which are disposed in a known manner to engage with each other in a first mutual angle of rotation, as well as to be free-running in a second angle of rotation perpendicular to the first. It is also possible in an uncomplicated variant to dispense with the drag link and have the inner end 27 of the lower tube sections 5, 6 extend right up as far as the shaft 36. In this case, the shaft 36 must be removable and selectably insertable in a consecutive series of holes along the inner end 27. It is clear that this variant will not afford the same quick and simple changeover as the examples described above and the gripping width is obviously inferior. In other uncomplicated designs, the designer might content himself with a single hitching means at the top of the door, or even with just a single broad hitching means at the top and a broad hook at the bottom. It is also possible to interconnect the operating means so that they are operated in parallel by means of a crossbar or similar arrangement.

What is claimed is:

1. A vehicle-mounted load carrier confined to be fastened across a hatch closure member of the carrying vehicle, said load carrier comprising:

a load-bearing frame and at least two gripping means disposed upon the load-bearing frame and intended to grip two substantially mutually opposite edges of the hatch closure member;

tensioning means for tensioning the gripping means across the hatch closure member by the positive mutual relative displacement thereof towards each other;

the load-bearing frame being divided into a main section bearing a gripping means for one edge of the hatch closure member, and at least one tensioning frame section disposed movably in relation to the main frame section and bearing a gripping means for an opposite edge of the hatch closure member;

the main frame section and the tensioning frame section being connected to each other in a linearly displaceable fashion so that tensioning is achieved by bringing about the mutual linear displacement of the main and tensioning frame sections by means of the tensioning means; and wherein each tensioning means includes an operating means mounted rotatably about a shaft and has a surface that is eccentric in relation to the shaft; and a bearing surface on a fulcrum interacting with the eccentric surface of the operating means, the shaft and hence the operating means being united to one of the frame sections and the fulcrum being united to the other frame section so that the operating means, and hence the load carrier can be caused to assume an unfastened and a fastened position corresponding to the more or less centered position of the fulcrum in relation to the shaft and to corresponding relative displacements of the frame sections.

2. The vehicle-mounted load carrier as recited in claim 1, wherein the main section and the tensioning section are connected to each other by means of at least one pair of telescopically displaceable tubes that achieve tensioning by telescopic movement of the tubes and matching mutual displacement of the main frame section and the tensioning frame section.

3. The vehicle-mounted load carrier as recited in claim 1, wherein the load-bearing frame includes two tensioning frame sections, each provided with gripping means for one edge and said tensioning frame sections each being connected to the main frame section in a linearly displaceable fashion and disposed one at each side of the load-bearing frame.

4. A vehicle-mounted load carrier as recited in claim 1, wherein the tensioning section includes a spring-loading means acting in the direction of insertion.

5. A vehicle-mounted load carrier as recited in claim 1, wherein the shaft of the operating means is arranged to pass transversely through the outer telescopic tube via elongated holes disposed along the length of the tube and thereby permitting movement of the shaft along the tube;

a drag link disposed inside the tube between the shaft and the inner telescopic tube, and the fulcrum being disposed on the outer tube and the eccentric surface disposed on the operating means in such a manner that the turning of the operating means from its unfastened to its fastened position, by the interaction between the eccentric surface of the operating means and the fulcrum, causes the shaft, the drag link, and hence the inner tube to slide telescopically into the outer tube.

6. A vehicle-mounted load carrier as recited in claim 5, wherein the drag link has a connection to the shaft which is adjustable longitudinally along the drag link.

7. A vehicle-mounted load carrier as recited in claim 6, wherein the drag link is elongate and the shaft passes through a hole in the drag link, the hole in the drag link is elongate and disposed longitudinally along the drag link and is formed with a slip side, which is straight, and a locking side having a row, parallel to the slip side, of mutually adjacent notches having the shape of circular segments;

the shaft is of a cross-section having the form of the major segment of a circle with a removed part in the form of a minor segment, the diameter of the circle being substantially equal to the perpendicular distance between the slip side and the bottom of one of the circular-segment shaped notches, and a smallest thickness of the shaft at the removed segment being substantially equal to the perpendicular distance between the slip side and the peaks separating the notches; and the shaft being rigidly united with the operating means in such a manner that when the operating means is in its unfastened position the shaft has its smallest thickness perpendicular to the slip side and is moveable in relation to the hole in the drag link so that when the operating means is in its fastened position part of the shaft is located in one of the circular segment shaped notches, thus blocking transverse movement of the drag link in relation to the shaft.

8. A load carrier comprising:

a rear-mount vehicular load carrier frame having an upper frame portion and a lower frame portion, said upper and lower frame portions each coupled to a securement arrangement for releasably securing the load carrier to a carrying vehicle;

a telescoping arrangement between said upper and lower frame portions for transitioning said load carrier between vehicle-secured and vehicle-released configurations; and said telescoping arrangement further comprising a component adapted with an elongate aperture, said elongate aperture having a varying width along a length thereof.

9. The load carrier as recited in claim 8, further comprising:

said upper frame portion being formed as a substantially U-shaped member constructed from substantially rigid material, said U-shaped member having a bight portion connecting to arm portions that project thereawayfrom; and said lower frame portion being formed from substantially rigid material and configured as two elongate legs, each elongate leg connected to a respective arm portion of said U-shaped member by a telescopic connection.

10. The load carries as recited in claim 8, further comprising:

said securement arrangement configured to hook about opposed edge portions of a component of a carrying vehicle.

11. The load carrier as recited in claim 8, further comprising:

wherein width variations along said elongate aperture in said component of said telescoping arrangement form a repetitively recurring pattern along a length thereof.

12. The load carrier as recited in claim 8, further comprising:

said upper frame portion being formed as a substantially U-shaped member constructed from substantially rigid tubular material, said U-shaped member having a bight portion connecting to arm portions that project thereawayfrom; and said lower frame portion being formed from substantially rigid tubular material and configured as two elongate legs, each elongate leg connected to a respective arm portion of said U-shaped member by a telescopic connection.

13. The load carrier as recited in claim 12, further comprising:

one of said arm portions of said U-shaped member and said elongate legs of said lower frame portion are adapted to telescopically receive the other of said arm portions of said U-shaped member and said elongate legs of said lower frame portion.

14. The load carrier as recited in claim 8, further comprising:

said telescoping arrangement including a drag link coupled between one of said two elongate legs of said lower frame portion and said upper frame portion, said drag link adapted with an elongate aperture, said elongate aperture having a scalloped side and an opposing smooth side for accommodating releasable fixation with a transitionable member located for length-wise movement in said elongate aperture.

15. The load carrier as recited in claim 14, further comprising:

a rotatable shaft positioned within said elongate aperture for length-wise movement therein, said shaft having differing width-wide dimensions depending on said shafts rotated position relative to said elongate aperture; and a biasing member configured to bias said one of said two elongate legs of said lower frame portion and said upper frame portion toward one another.

16. The load carrier as recited in claim 8, further comprising:

said varying width of said elongate aperture in said component of said telescoping arrangement uniformly and repetitively recurring along a length thereof.

17. The load carrier as recited in claim 16, further comprising:
   said elongate aperture having a scalloped side and an opposing smooth side for accommodating releasable fixation with a transitionable member located for length-wise movement in said elongate aperture.

18. The load carrier as recited in claim 17, further comprising:
   a rotatable shaft positioned within said elongate aperture for length-wise movement therein, said shaft having differing width-wide dimensions depending on said shaft's rotated position relative to said elongate aperture.

19. A vehicle-mountable load carrier configured to be fastened upon a hatch closure member of a carrying vehicle, said load carrier comprising:
   a load-bearing frame having at least two gripping arrangements, one each of said at least two gripping arrangements being located at substantially opposite ends of said load-bearing frame, and each of said gripping arrangements being adapted to anchor upon an edge portion of a hatch closure member of a carrying a vehicle for said vehicle-mountable load carrier;
   said load-bearing frame comprising at least two frame sections connected together for relative linear displacement one with respect to the other and one of said two gripping arrangements being connected upon each of said frame sections; and
   a tensioning mechanism interconnected between said two frame sections and configured to draw said two gripping arrangements one toward the other for fastening said vehicle-mountable load carrier to a carrying vehicle.

20. The vehicle-mountable load carrier as recited any claim 19, further comprising:
   said two frame sections being connected together via telescopically displaceable tubes.

21. The vehicle-mountable load carrier as recited any claim 19, further comprising:
   said tensioning mechanism including a biasing spring housed within a portion of said load bearing frame.

22. The vehicle-mountable load carrier as recited any claim 19, further comprising:
   said tensioning mechanism including a scalloped component operable for adapting said vehicle-mountable load carrier to fit differently sized hatch closure members of a carrying vehicle.

* * * * *